United States Patent [19]
Priest

[11] Patent Number: 5,777,737
[45] Date of Patent: Jul. 7, 1998

[54] APPARATUS AND METHOD FOR PROCESSING SIGNALS OUTPUT FROM FIBER OPTIC RATE GYROSCOPE HAVING 3×3 COUPLER

[75] Inventor: John F. Priest, Tomball, Tex.

[73] Assignee: Litton Systems, Inc., Woodland Hills, Calif.

[21] Appl. No.: 795,808

[22] Filed: Feb. 5, 1997

Related U.S. Application Data

[63] Continuation of Ser. No. 608,767, Feb. 29, 1996, abandoned, which is a continuation of Ser. No. 279,151, Jul. 22, 1994, abandoned.

[51] Int. Cl.$^6$ .................................................. G01C 19/72
[52] U.S. Cl. .................................................. 356/350
[58] Field of Search .................................................. 356/350

[56] References Cited

U.S. PATENT DOCUMENTS

| | | |
|---|---|---|
| 4,440,498 | 4/1984 | Sheem . |
| 4,479,715 | 10/1984 | Sheem . |
| 5,031,988 | 7/1991 | Okada . |
| 5,037,204 | 8/1991 | Poisel et al. . |
| 5,062,710 | 11/1991 | Okada et al. . |
| 5,080,488 | 1/1992 | Buehler et al. . |
| 5,146,292 | 9/1992 | Buehler et al. . |
| 5,195,151 | 3/1993 | Campbell, Jr. et al. . |
| 5,227,860 | 7/1993 | Hartl et al. . |
| 5,345,307 | 9/1994 | Ishigami . |
| 5,486,921 | 1/1996 | Priest . |

*Primary Examiner*—Samuel A. Turner
*Attorney, Agent, or Firm*—John H. Lynn

[57] ABSTRACT

A fiber optic rotation sensor includes a 3×3 optical coupler formed of first, second and third optical waveguides. The first, second and third optical waveguides are formed such that the fractions of light coupled from any one of the first, second and third optical waveguides to the other two optical waveguides are constant, independent of thermally-induced changes in the interaction length. An optical signal source provides an input optical signal to the first optical waveguide such that portions of the input optical signal are coupled from the first optical waveguide into the second and third optical waveguides. The optical fiber in which the sensing loop is formed has ends that are coupled to the second and third optical waveguides to receive optical signals that form counterpropagating optical waves in a fiber optic sensing loop and to combine the counterpropagating optical waves after they have traversed the sensing loop.

6 Claims, 8 Drawing Sheets

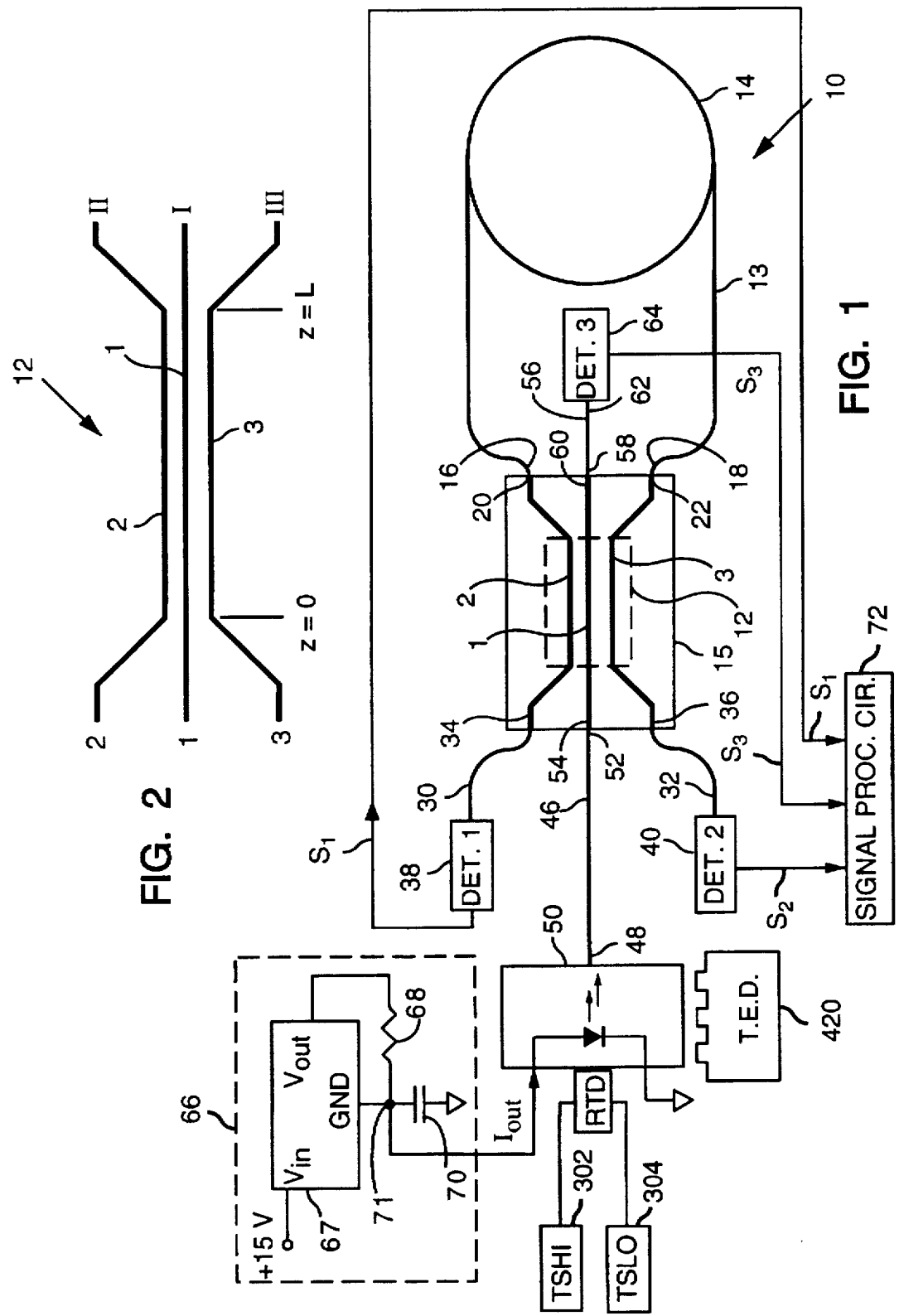

APPARATUS AND METHOD FOR PROCESSING SIGNALS OUTPUT FROM FIBER OPTIC RATE GYROSCOPE HAVING 3×3 COUPLER

This a continuation of application Ser. No. 08/608,767 filed on Feb. 29, 1996, abandoned which was a continuation of Ser. No. 08/279,151, filed Jul. 22, 1994, abandoned.

BACKGROUND OF THE INVENTION

This invention relates generally to Sagnac effect rotation sensors and particularly to fiber optic rotation sensors that guide counterpropagating light waves in a sensing loop to measure rotations about a sensing axis perpendicular to the plane of the sensing loop. Still more particularly, this invention relates to signal processing techniques for fiber optic rotation sensors that use 3×3 couplers to supply optical signals to the sensing loop and to guide the optical output signals from the sensing loop to electrical apparatus that processes the optical output signals to determine the rotation rate.

Fiber optic rotation sensors are well-known in the art. Previous fiber optic rotation sensors included evanescent field couplers to couple light between two lengths of optical fiber. Subsequently, fiber optic rotation sensors using 3×3 coupler were developed. The primary advantage of using a 3×3 coupler in a fiber optic rotation sensor is the ease with which such devices are interfaced with electronics.

U.S. Pat. Nos. 4,440,498 and 4,479,715 to Sheem disclose two fiber optic rotation sensors that include 3×3 couplers. U.S. Pat. No. 4,440,498 is directed to a fiber optic rotation sensor that includes a fiber optic sensing loop and an input fiber. A 3×3 fiber optic coupler divides light between the input fiber and the two legs of the fiber optic sensing loop.

U.S. Pat. No. 4,479,715 discloses a Sagnac effect rotation sensor in which the ends of a fiber optic sensing loop are coupled to a pair of optical waveguides. Light is input to a central input waveguide that is between the optical waveguides that are coupled to the ends of the sensing loop fiber. The three optical waveguides are arranged to form a 3×3 optical coupler. The input light is coupled from the central input waveguide to the optical waveguides that are connected to the optical fiber coil to produce the counterpropagating waves in the fiber optic sensing loop. The waves traverse the sensing coil and combine in the coupler. The combined waves are detected, and the resulting electrical signals are processed to determine the rotation rate.

U.S. Pat. No. 4,944,590 to Poisel et al. discloses an optical fiber gyroscope that uses a 3×3 coupler to couple optical signals into and out of a fiber optic sensing loop. Poisel et al. discloses a photodetector arranged to detect the light that has been input the 3×3 coupler that is not coupled into the fiber optic sensing loop. The electrical signal resulting from detecting this light is used in signal processing circuitry to make adjustments for variations in the input light intensity.

Such fiber optic rotation sensors may be operated in phase quadrature, which provides maximum sensitivity at zero rotation rate. Unfortunately, previous fiber optic rotation sensors that include 3×3 optical couplers are sensitive to temperature changes. The coupling ratios of the 3×3 fiber optic couplers are temperature-sensitive such that bias errors of 1000° per hour are typically observed. Errors of such magnitude are unacceptable for most applications of rotation sensors.

SUMMARY OF THE INVENTION

The present invention is directed to improved signal processing techniques for use with fiber optic rotation sensor that use 3×3 optical couplers to introduce the counterpropagating waves into a sensing coil and to produce the interference pattern that is output from the sensing coil. The invention is further directed to improved techniques for controlling the intensity of optical signals input the sensing coil by controlling the drive current and temperature of the laser diode that is used as the optical signal source.

Accordingly, apparatus according to the present invention comprises first and second photodetectors arranged to produce a first and second signals $S_1$ and $S_2$ respectively, that are indicative of optical signals output from the sensing loop due to interference of counterclockwise propagating waves and clockwise propagating waves, respectively, in the sensing loop to a first one of the optical waveguides. A third photodetector produces a signal $S_3$ indicative of the optical signal input to the 3×3 coupler. Part of the signal input to the 3×3 coupler divides between a pair of optical waveguides, which direct light to the sensing coil to form the counterpropagating waves. The rest of the signal input to the 3×3 coupler is guided to the third photodetector. An analog signal processor is connected to the first, second and third photodetectors to receive the signals $S_1$, $S_2$ and $S_3$. The analog signal processor is arranged to calculate the rate of rotation of the sensing loop as a function of the signals $S_1$, $S_2$ and $S_3$.

The analog signal processor may, in one embodiment of the invention, calculate the angle of rotation using the equation $$\frac{S_1 - S_2}{k_1 S_3} = \sin\phi$$

where $\phi$ is the angle of rotation rate and $k_1$ is a constant.

In another embodiment of the present invention, the analog signal processor calculates the angle of rotation using the equation $$\phi = \tan^{-1}\left(\frac{k_3}{k_1}\left(\frac{S_1 - S_2}{S_1 + S_2 - k_2 S_3}\right)\right),$$

where $\phi$ is the angle of rotation and $k_1$, $k_2$ and $k_3$ are constants.

The present invention preferably further comprises intensity control circuitry for processing the signal $S_3$ to produce a feedback signal that is input to the optical signal source to maintain the drive current of the optical signal source at a constant magnitude.

The intensity control circuitry included in the present invention may comprise an integrating circuit connected to the third photodetector to receive the signal $S_3$ and a transconductance amplifier connected between the integrating circuit and the optical signal source to supply a constant current thereto. In a preferred embodiment, the transconductance amplifier comprises an operational amplifier connected to the integrating circuit and a JFET having its gate connected to the operational amplifier. A voltage source is connected to the source of the JFET and a diode is connected between the drain of the JFET and the optical signal source.

The present invention may also include temperature control apparatus for maintaining the optical signal source a temperature that is between a predetermined upper temperature limit and a predetermined lower temperature limit. The temperature control apparatus preferably includes temperature sensing apparatus that produces an error signal when the temperature of the optical signal source deviates from a set point by predetermined limits. A differential amplifier amplifies the error signal and produces signals that are input to the gates of a pair of JFETS. A thermoelectric device is connected between the drains of the JFETS and an operational amplifier. The circuitry applies an electrical signal to the thermoelectric device to heat or cool the optical signal source as necessary to return its temperature to the set point.

An appreciation of the objectives of the present invention and a more complete understanding of its structure and method of operation may be had by studying the following description of the preferred embodiments and by referring to the accompanying drawings.

BRIEF DESCRIPTION OF THE DRAWINGS

FIG. 1 illustrates a fiber optic rotation sensor that includes a 3×3 evanescent field optical coupler;

FIG. 2 schematically illustrates a 3×3 coupler; and

DESCRIPTION OF THE PREFERRED EMBODIMENT

Figure 3:
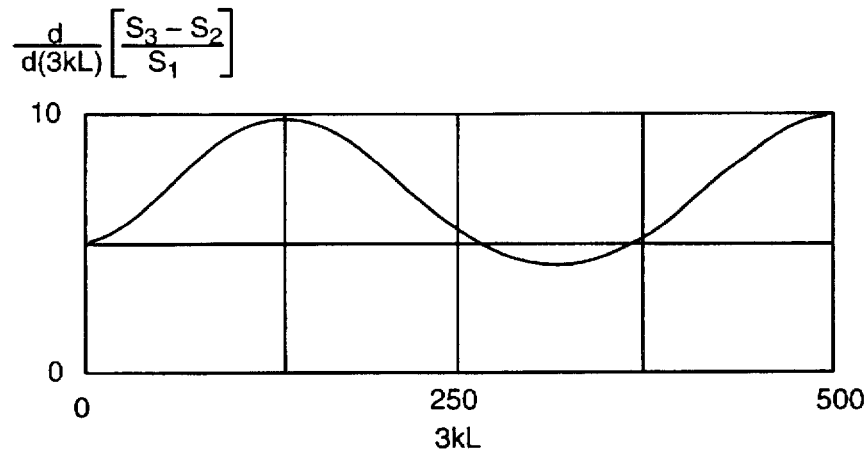
FIG. 3 illustrates the derivative with respect to coupling length of the intensity of the signal output by the fiber optic rotation sensor of FIG. 1.

Referring to FIG. 1, a fiber optic rotation sensor 10 includes a 3×3 optical coupler 12 and a length of optical fiber 13 arranged to form a fiber optic sensing coil 14. The optical coupler 12 includes optical waveguides 1–3 formed on a substrate 15. The optical fiber 13 has ends 16 and 18. The fiber ends 16 and 18 are butt-coupled to ends 20 and 22 of the corresponding optical waveguides 1 and 3, respectively.

A pair of output optical fibers 30 and 32 are connected to ends 34 and 36 of the optical waveguides 2 and 3, respectively. The output optical fiber 30 directs a light beam to first photodetector 38, which produces an electrical signal $S_1$ that is indicative of the intensity of the optical signal transmitted thereto by the output optical fiber 30. Similarly, the output optical fiber 32 directs a beam of light to a second photodetector 40, which produces an electrical signal $S_2$ that is indicative of the intensity of the optical signal transmitted thereto by the output optical fiber 32.

The optical waveguide 1 is formed in the substrate 15 between the optical waveguides 2 and 3. The optical waveguides 1–3 are arranged to form the 3×3 fiber optic coupler 12. The 3×3 coupler 12 is preferably an evanescent field coupler.

An input optical fiber 46 has an end 48 that receives light from a light source 50, which is preferably a broadband laser diode. The other end 52 of the input optical fiber 46 is butt-coupled to an end 54 of the optical waveguide 1. An output optical fiber 56 has one end 58 butt-coupled to an end 60 of the central optical waveguide 3. The other end 62 of the output optical fiber 56 directs a beam of light to a third detector 64, which produces an electrical signal $S_3$ that is indicative of the intensity of the optical signal transmitted thereto by the output optical fiber 56. The electrical signals output from the photo-detectors 38, 40 and 64 are input to a signal processing circuit 72. Several preferred embodiments of the signal processing circuit 72 are described subsequently in this disclosure.

The light source 50 is connected to a constant current source 66 to receive power therefrom. The constant current source 66 preferably has an output of about 50 mA. The current source 66 preferably includes a commercially available LM340612 integrated circuit 67. The current output of the integrated circuit 67 passes through a resistor 68. A first terminal of a capacitor 70 is connected to the ground terminal of the integrated circuit 67. The other terminal of the capacitor 70 is connected to ground. The resistor 68 is also connected to the first terminal of the capacitor 70 at a junction 71, which is connected to the light source 50 to provide a driving current thereto.

The 3×3 fiber optic coupler 12 is preferably an evanescent field coupler that couples optical signals between the optical waveguide 1 and the optical waveguides 2 and 3. A portion of the light input to the 3×3 fiber optic coupler 12 remains in the optical waveguide 1.

Referring to FIG. 3, the 3×3 coupler has a coupling length L in which the evanescent fields of light waves guided by the waveguides 1–3 interact so that light couples between them. The intensity of light coupled between the waveguides 1–3 is a function of the coupling length L. As the temperature of the coupler 12 fluctuates, the light intensity coupled between the waveguides 1–3 also fluctuates.

In an ideal environment the three coupling ratios of the 3×3 fiber optic coupler 20 are all equal to ⅓. When the coupling ratios are all equal to ⅓, the light intensities output from the three optical waveguides 1–3 are equal. However, because of temperature sensitivity mentioned above, if the coupling ratios of the 3×3 fiber optic coupler 20 are all ⅓ at a particular desired operating temperature, then unacceptably large errors result because of unavoidable temperature fluctuations that cause the coupling ratios to change. The present invention comprises a fiber optic rotation sensor using a 3×3 couplers that have coupling ratios selected to minimize the bias errors to the order of 10° to 100° per hour and which is insensitive to temperature changes. It has been found that there is a set of coupling ratios for which the fraction of light coupled into any selected one of the optical waveguides 1–3 remains constant as the coupling length L changes in response to temperature changes.

The optimum configuration for the 3×3 fiber optic coupler 20 is insensitive to temperature changes while providing a larger rate discriminant than has been obtained with previous designs. Referring to FIGS. 2 and 3, the 3×3 fiber optic coupler 20 may be described by the linear differential equations $$\frac{da_j}{dz} + ik_{j,j+1}a_{j+1} + ik_{j,j+2}a_{j+2} = 0 \tag{1}$$

where:

$j = 1,2,3$ $j = j+3$ $a_j$ is the light amplitude in waveguide j; and k is the coupling ratio between any two of the three fibers 1–3.

For example, $k_{12}$ is the coupling ratio between waveguides 1 and 2;
$k_{23}$ is the coupling ratio between waveguides 2 and 3, and $k_{31}$ is the coupling ratio between waveguides 3 and 1. The coupler 12 is preferably formed so that the coupling constants are $k_{12}=k_{23}=k_{31}=k$ so that the solution to equation (1) is $$\sum_{j=1}^{3} c_j = 1,$$

where c and d are constants. If the power input to the fiber optic rotation sensor 10 by the input optical fiber 46 to the 3×3 coupler 12 is $A^2$, then the amplitude of the light in the waveguides at the input end where z=0 is given by:

$$a_1(0) = A, \quad (3)$$

and $$a_2(0) = a_3(0) = 0. \quad (4)$$

Using Eqs. (3) and (4) in Eq. (1) gives information that may be used to find expressions for the constants c and d in terms of A, for which a numerical value can easily be ascertained.

$$A = c_1 e^{ik0} + d e^{-i2k0}. \quad (5)$$

$$A = c_1 + d. \quad (6)$$

$$c_1 = A - d. \quad (7)$$

$$0 = c_2 e^{ik0} + d e^{-i2k0}. \quad (8)$$

$$c_2 = -d. \quad (9)$$

$$0 = c_3 e^{ik0} + d e^{-i2k0}. \quad (10)$$

$$c_3 = -d. \quad (11)$$

From Eqs. (7), (9) and (11), it is found that $$c_1 + c_2 + c_3 = 0. \quad (12)$$

$$A - d - d - d = 0. \quad (13)$$

Therefore, the constants $c_1$, $c_2$, $C_3$ and d are given by:

$$d = \frac{A}{3}; \quad (14)$$

$$c_2 = c_3 = -\frac{A}{3}; \text{ and} \quad (15)$$

$$c_1 = \frac{2}{3} A. \quad (16)$$

At the other end of the coupler where the distance z=L, the solution equation for optical waveguide 1 becomes:

$$a_1(L) = \frac{2}{3} A e^{ikL} + \frac{1}{3} A e^{-i2kL}. \quad (17)$$

Squaring the amplitude to obtain the intensity of the light in optical waveguide 1 gives:

$$|a_1(L)|^2 = \left| \frac{2}{3} A e^{ikL} + \frac{1}{3} A e^{-i2kL} \right|^2. \quad (18)$$

$$|a_1(L)|^2 = \frac{A^2}{9} |2e^{ikL} + e^{-i2kL}|^2. \quad (19)$$

$$|a_1(L)|^2 = \frac{A^2}{9} |2\cos kL + i2\sin kL + \cos 2kL - i\sin 2kL|^2. \quad (20)$$

$$|a_1(L)|^2 = \frac{A^2}{9} |2\cos kL + \cos 2kL + i(2\sin kL - \sin 2kL)|^2. \quad (21)$$

$$|a_1(L)|^2 = \frac{A^2}{9} (4\cos^2 kL + 4\cos kL \cos 2kL + \cos^2 2kL + \quad (22)$$

$$4\sin^2 kL - 4\sin kL \sin 2kL + \sin^2 2kL).$$

$$|a_1(L)|^2 = \frac{A^2}{9} (5 + 4\cos 3kL). \quad (23)$$

A the other end of the coupler where the distance z=L, the on for optical waveguide 2 becomes:

$$|a_2(L)|^2 = \left| -\frac{1}{3} A e^{ikL} + \frac{1}{3} A e^{-i2kL} \right|^2. \quad (24)$$

$$|a_2(L)|^2 = \frac{A^2}{9} |-\cos kL - i\sin kL + \cos 2kL - i\sin 2kL|^2. \quad (25)$$

$$|a_2(L)|^2 = \frac{A^2}{9} |(-\cos kL + \cos 2kL) - i(\cos kL + \sin 2kL)|^2. \quad (26)$$

$$|a_2(L)|^2 = \frac{A^2}{9} (\cos^2 kL - 2\cos kL \cos 2kL + \cos^2 2kL) + \quad (27)$$

$$\sin^2 kL + 2\sin kL \sin 2kL + \sin^2 2kL).$$

$$|a_2(L)|^2 = \frac{A^2}{9} (2 - 2(\cos kL \cos 2kL - \sin kL \sin 2kL)). \quad (28)$$

$$|a_2(L)|^2 = \frac{2A^2}{9} (1 - \cos 3kL). \quad (29)$$

Because $a_2 = a_3$, where the distance z=L, the solution equation for optical waceguide 3 is:

$$|a_3(L)|^2 = |a_2(L)|^2 = \frac{2A^2}{9} (1 - \cos 3kL). \quad (30)$$

The optical intensity in the optical waveguides 2 and 3 is the optical intensity input to the fiber optic sensing coil 14 at the ends 16 and 18 of the optical fiber 12. Therefore the input to the legs of the fiber optic gyroscope are $|a_2(L)|^2$ and $|a_3(L)|^2$ given by Eqs. (29) and (30). These inputs to the fiber optic sensing coil 14 have a definite phase relationship. After traversing the fiber optic sensing coil 14, there is a phase shift $\phi$ between the counterpropagating waves. The return inputs to the coupler 12 after the counterpropagating waves traverse the fiber optic sensing coil 14 are given by:

$$a_1(0) = 0; \quad (31)$$

$$a_2(0) = \left[ 2 \frac{A^2}{9} (1 - \cos 3kL) \right]^{.5} e^{\frac{i\phi}{2}}; \quad (32)$$

and $$a_3(0) = \left[ 2 \frac{A^2}{9} (1 - \cos 3kL) \right]^{.5} e^{\frac{i\phi}{2}}. \quad (33)$$

Loop loss in the optical fiber 12 is ignored. The angle $\phi$ is the Sagnac phase shift angle between the beams caused by rotation of the sensing loop at angular velocity $\Omega$ about the sensing axis, which is perpendicular to the plane of the fiber optic sensing coil 14. The phase angle $\phi$ and the angular velocity $\Omega$ are related by the Sagnac equation:

$$\phi \frac{2\pi lD}{\lambda c} \Omega. \tag{34}$$

where l is the length of the fiber in the sensing coil 14, D is the diameter of the sensing coil 14, λ is the wavelength of the optical signals and c is the speed of light.

After propagating through the coupler 12 through the coupling length, L, the optical signals that have been output from the output of the fiber optic sensing coil are given by:

$$a_{II}(\phi,L) = \frac{1}{3} \left[ \frac{2A^2}{9}(1-\cos 3kL) \right]^{0.5} \left[ \cos\frac{\phi}{2} + i3\sin\frac{\phi}{2} \right] e^{ikL} \frac{2}{3} \left[ \frac{2A^2}{9}(1-\cos 3kL) \right]^{0.5} \cos\frac{\phi}{2} e^{-ikL}. \tag{35}$$

$$a_{II}(\phi,L) = \frac{1}{3} \left[ \frac{2A^2}{9}(1-\cos 3kL) \right]^{0.5} \left[ \cos\frac{\phi}{2} + i3\sin\frac{\phi}{2} \right] e^{ikL} + 2\cos\frac{\phi}{2} e^{-ikL}. \tag{36}$$

$$|a_{II}(\phi,L)|^2 = \frac{1}{9} \left[ \frac{2A^2}{9}(1-\cos 3kL) \right] * \left| \left[ \left( \cos\frac{\phi}{2} + i3\sin\frac{\phi}{2} \right)(\cos(kL) + i\sin kL) + 2\cos\phi(\cos(2kL) - i\sin 2kL) \right] \right|^2. \tag{37}$$

$$|a_{II}(\phi,L)|^2 = \frac{2A^2}{81}(1-\cos 3kL) \left[ \cos\frac{\phi}{2}\cos kL - 3\sin\frac{\phi}{2}\sin kL + 2\cos\phi\cos kL + i\left( 3\sin\frac{\phi}{2}(\cos kL) + \cos\phi\sin kL - 2\cos\phi\sin 2kL \right) \right]^2. \tag{38}$$

$$|a_{II}(\phi,L)|^2 = \frac{2A^2}{81}(1-\cos 3kL)(7 + 2\cos 3kL - 2\cos\phi(1-\cos 3kL) + 6\sin\phi\sin 3kL). \tag{39}$$

The output of the detector 64 is a quantity $S_3$ given by the following equation:

$$S_3 = |a_{III}(L)|^2 = \frac{A^2}{9}(5 + 4\cos 3kL). \tag{40}$$

Referring to Eq. (39) and FIGS. 1 and 2, the signals output from the detectors 38 and 40 are signals $S_1$ and $S_2$ given by $$S_{1,2} = \frac{2A^2}{81}(1-\cos 3kL)(7 + 2\cos 3kL) - 2\cos\phi(1-\cos 3kL) \pm 6\sin\phi\sin 3kL). \tag{41}$$

In Eq. (41) the "+" applies to the signal $S_1$ and the "−" sign applies to the signal $S_2$.

The signal output of the fiber optic rotation sensor 10 may be written in terms of $S_1$, $S_2$ and $S_3$:

$$\frac{S_1 - S_2}{S_3} = \frac{2A^2}{81} \frac{9}{A^2} \frac{(1-\cos 3kL)(12\sin\phi)\sin 3kL}{5 + 4\cos 3kL}. \tag{42}$$

$$\frac{S_1 - S_2}{S_3} = \frac{8}{3} \sin\phi \frac{(1-\cos 3kL)\sin 3kL}{5 + 4\cos 3kL}. \tag{43}$$

$$\frac{S_1 - S_2}{S_3} = k_1 \sin\phi, \tag{44}$$

which is nominally constant for any given configuration of the coupler.

The inventor has found that there is an optimum set of coupling ratios for the coupler that do not change as environmental factors change the coupling length. What is desired is to find the maxima and minima in the relationship of Eq. (43) with respect to the argument (3kL) of the trigonometric functions in Eq. (43) to determine whether there is an optimum set of coupling ratios that do not change as the coupling length L changes. Therefore, taking the derivative of Eq. (43) with respect to (3kL) gives:

$$\frac{d}{d(3kL)} \left[ \frac{S_1 - S_2}{S_3} \right] = \frac{8}{3} \sin\phi \left[ (\sin^2 3kL + \right. \tag{45}$$

$$(1 - \cos 3kL)\cos 3kL \sin 3kL * (5 + 4\cos 3kL) +$$

$$4(1 - \cos 3kL)\sin^2 3kL ] (5 + 4\cos 3kL)^{-2}.$$

At the maxima and minima of Eq. (43), the function has zero slope. Therefore, near the maxima and minima of Eq. (43), the coupler 12 has minimum sensitivity to temperature changes. To find maxima and minima in Eq. (43) the derivative given by Eq. (45) is set to equal zero, which gives:

$$0 = -4\cos^3 3kL - 10\cos^2 3kL + 5\cos 3kL + 9. \tag{46}$$

Solving Eq. (46) for 3kL gives $$3kL = 148.061 \text{ rad}. \tag{47}$$

Therefore the quantity kL is $$kL = 49.354 \text{ rad}. \tag{48}$$

Looking at the graph of FIG. 2, it is seen that the output has a maximum value when 3kL=148.061 rad. Using the value of kL from Eq. (48) in Eq., (44), it is found that the signal output of the fiber optic rotation sensor 10 is $$\frac{S_1 - S_2}{S_3} = 1.624\sin\phi. \tag{49}$$

Returning to Eqs. (22), (29) and (30), we than find that $$|\alpha_3(L)|^2 = \frac{A^2}{9}(5 + 4\cos 3kL) = \frac{A^2}{9}(5 + 4\cos(148.061)). \tag{50}$$

$$|\alpha_3(L)|^2 = \frac{A^2}{9}(5 + \cos(148.061)) \tag{51}$$

$$|\alpha_3(L)|^2 = 0.1783 A^2 \tag{52}$$

$$|\alpha_2(L)|^2 = \frac{2A^2}{9}(1 - \cos 3kL) = \frac{2A^2}{9}(1 - \cos(148.061)) = 0.4108 A^2. \tag{53}$$

$$|\alpha_2(L)|^2 = 0.4108 A^2 \tag{54}$$

$$|\alpha_1(L)|^2 = |\alpha_2(L)|^2 = 0.4108 A^2. \tag{55}$$

Therefore, the coupler splitting ratio is 0.4108:0.1783:0.4108. Referring to Eq. 34, the solution equation for the fiber optic rotation sensor is $$\text{Output} = 1.624\sin\phi = 1.624\sin\left( \frac{2\pi lD}{\lambda c} \Omega \right) \tag{56}$$

For this particular set of coupling ratios, the coupler 12 is insensitive to variations in coupling length that typically occur over time and temperature. The signals on the output legs are higher for this set of coupling ratios than for other coupling ratios.

Figure 4:
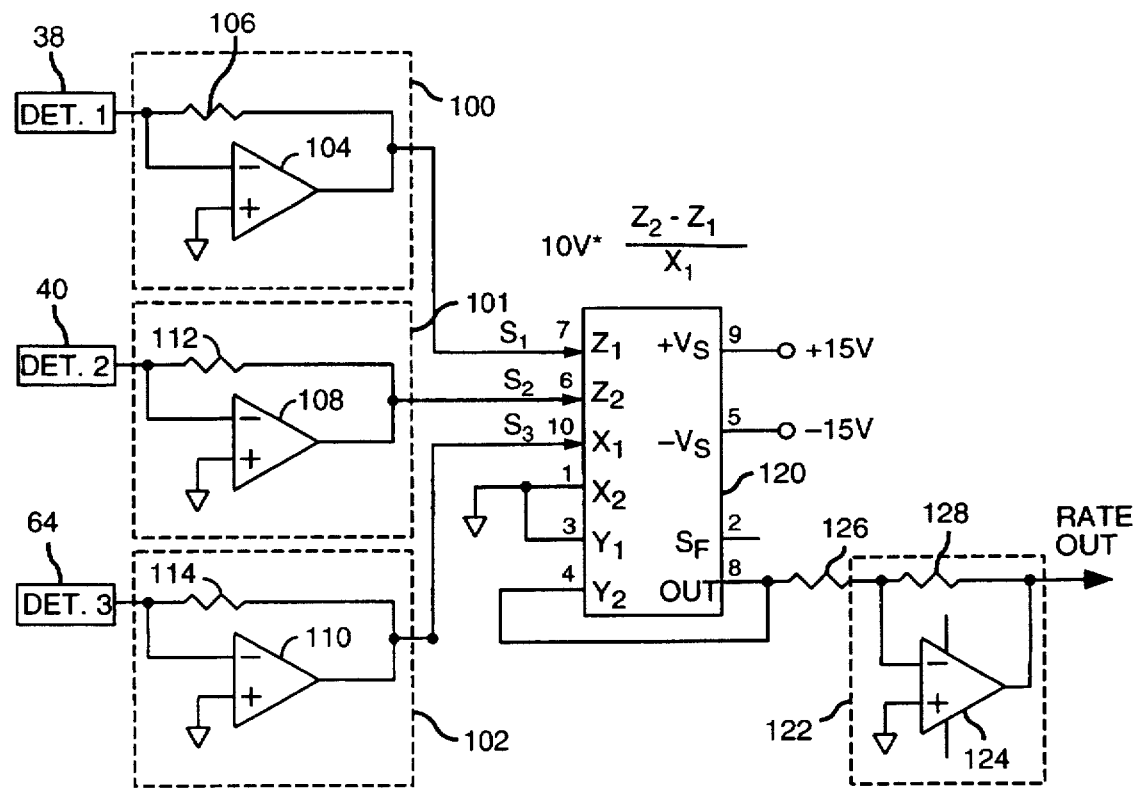
FIG. 4 illustrates a first electronic circuit for processing signals output from the fiber optic rotation sensor of FIG. 1 to produce a rotation rate output signal.

The circuitry of FIG. 4 is designed to solve the transfer function $$k\sin\phi = \frac{S_1 - S_2}{S_3} \quad . \tag{57}$$

The transfer function of Eq. (57) may be solved for sin φ, which gives:

$$\sin\phi = \frac{S_1 - S_2}{kS_3} \quad . \tag{58}$$

For small angles the approximation sinφ=φ may be used, which then gives.

$$\phi = \frac{S_1 - S_2}{kS_3} \quad . \tag{59}$$

For kL=30°, the constant k=0.533. For kL=40°, the constant k =1.1547. For kL=45.3536806° the constant k=1.624. The coupling coefficient satisfies the conditions that 0.5<k<1.65.

FIG. 4 illustrates a circuit that may be used as the signal processing circuitry 72 of FIG. 1. Referring to FIG. 4, the outputs $S_1$, $S_2$ and $S_3$ are input to operational amplifier circuits 100-102, respectively. The operational amplifier circuits 100-102 are connected as scaling or multiplier circuits. The operational amplifier circuits 100-102 are essentially identical, therefore, only the operational amplifier circuit 100 is described in detail. The operational amplifier circuit includes an operational amplifier 104. The output signal $S_1$ of the detector 38 is input to the inverting input of the operational amplifier 104. A resistor 106 is connected across the inverting input of the operational amplifier 104 and its output. The non-inverting input of the operational amplifier 104 is grounded. Biasing voltages of ±15 volts may be applied to the operational amplifier 104 as shown in FIG. 4.

The operational amplifier circuits 101 and 102 include operational amplifiers 108 and 110 and resistors 112 and 114 connected together in the same manner as described above for the operational amplifier 104 and the resistor 106. The operational amplifiers 104, 108 and 110 preferably are OP2705D operational amplifiers, which are commercially available. The resistors 106, 112 and 114 preferably each have resistance values of about 1.78 MΩ.

The output signals from the operational amplifier circuits 100-102 are input to an analog signal processor 120, which may be a commercially available AD5345D analog device. The amplified signals from detectors 38, 40 and 64 are input to terminals $Z_1$, $Z_2$ and X, respectively of the analog signal processor 120. The analog signal processor 120 has input terminals $X_2$ and $Y_1$ that are grounded. An input terminal $Y_2$ is connected to the output terminal of the analog signal processor 120. The terminals +VS and –VS have voltages of +15 and –15 volts, respectively applied thereto. As shown in FIG. 4 the analog signal processor 120 has a transfer function:

$$\text{Output}_{signal\ processor} = 10V \frac{(Z_2 - Z_1)}{(X_1 - X_2)} + Y_1 \tag{60}$$

where:

$X_1=kS_3$;

$Z_1=kS_2$;

and $Z_2=kS_1$.

The inputs $X_2$ and $Y_1$ are grounded, therefore $X_2=Y_1=0$ volts.

The transfer functions of the three operational amplifier circuits 100-102 are each Output(volts)$_{op\ amp}$=$I_{in}$(1.78×10$^6$ Ω).

The output of the analog signal processor 120 is input to an operational amplifier circuit 122, which includes an operational amplifier 124 and a pair of resistors 126 and 128. The operational amplifier 124 preferably is a commercially available OP270 operational amplifier. The resistor 126 is connected between the output of the analog signal processor 120 and the inverting input of the operational amplifier 124. The resistor 128 is connected between the inverting input of the operational amplifier 124 and its output. The non-inverting input of the operational amplifier 124 is grounded. The resistors 126 and 128 preferably are 2 KΩ and 14 KΩ, respectively. The transfer function of the operational amplifier circuit 122 is therefore:

$$\text{Output (volts)} = V_{in}\left(\frac{R_{126}}{R_{128}}\right) = V_{in}(7). \tag{61}$$

which is the rate output signal of the fiber optic rotation sensor system 10. The constant current source 66 that powers the light source 50 preferably has an output of 50 mA.

The resistance values of the resistors 106, 112 and 114 are adjusted as required to balance the electro-optic functions $S_1$, $S_2$ and $S_3$. The resistance values of the resistor 128 is used to adjust the output signal level to provide output scaling in volts/radlsec of the Sagnac phase shift. The resistance value of the resistor 68 may be adjusted to adjust the current input to the optical signal source 50 which determines the optical power input to the system.

Figure 5:
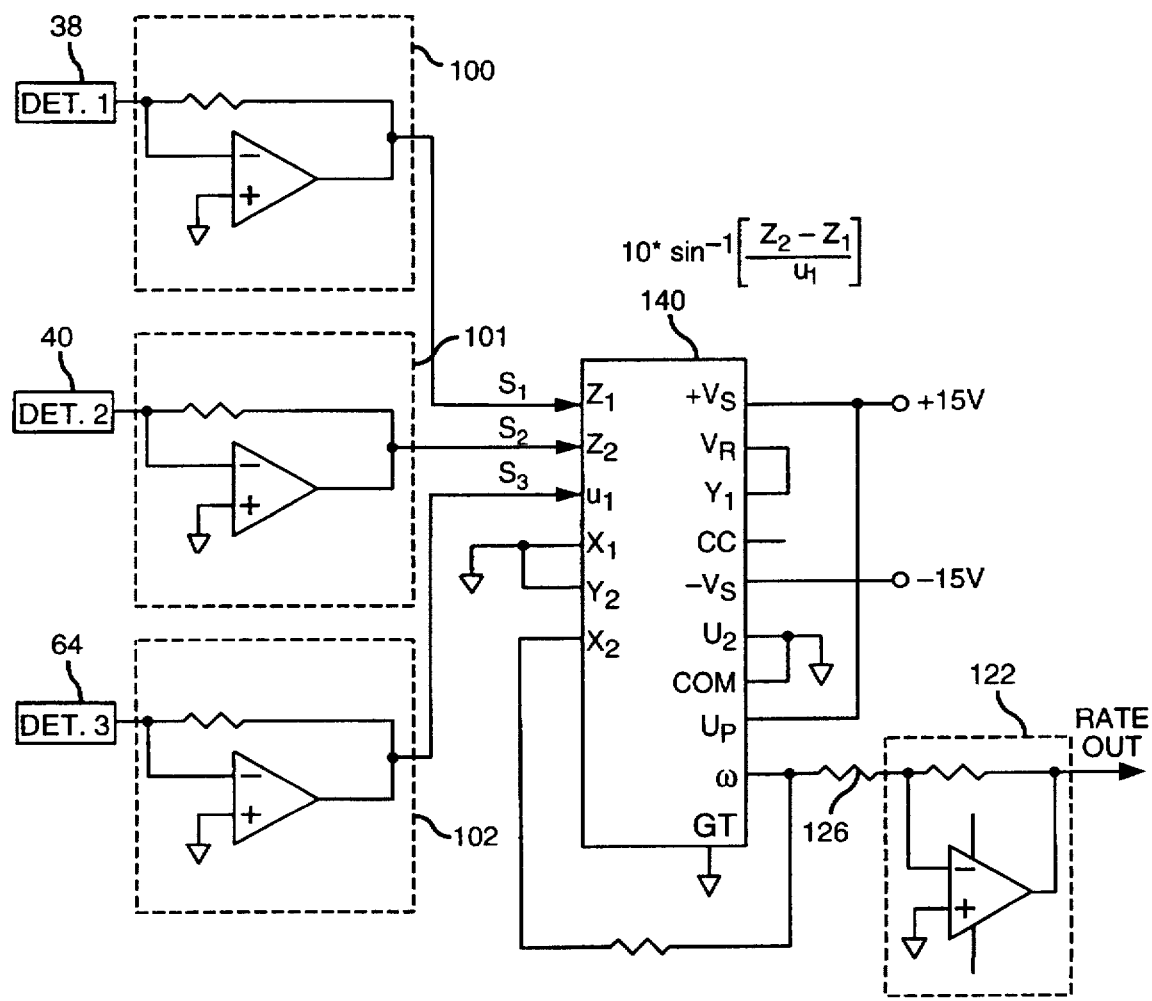
FIG. 5 illustrates a first electronic circuit for processing signals output from the fiber optic rotation sensor of FIG. 1 to produce a rotation rate output signal.

Because the sine function is non-linear, the circuit of FIG. 4 may not be suitable for applications where high accuracy is required. Accordingly, FIG. 5 illustrates a second circuit that may be used as the signal processing circuitry 72 of FIG. 1 in high accuracy applications. The circuit of FIG. 5 is similar to that of FIG. 4 but with a different analog signal processor being used to process the electro-optic functions $S_1$, $S_2$ and $S_3$. The circuit of FIG. 5 calculates the arcsine of the angle, which avoids the non-linearities of the sine function. A analog signal processor 140, which is preferably a commercially available AD639 analog signal processor, has inputs $Z_1$, $Z_2$, $u_2$, $u_2X1_1$, $X_2$, $Y_1$, and $Y_2$. The analog signal processor 140 also has terminals $V_S$, $V_R$, comm, uP, a ground terminal GT and an output terminal ω.

The electro-optic functions $S_1$, $S_2$ and $S_3$ from the operational amplifier circuits 100-102, respectively are input to the terminals $Z_1$, $Z_2$ and $u_1$, respectively of the analog signal processor 140. The transfer function of the analog signal processor 140 as shown connected in the circuit of FIG.5 is $$\text{Output} = \sin^{-1}\left(\frac{Z_2 - Z_1}{u_2 - u_1}\right) = \left(\sin^{-1}\left(\frac{Z_2 - Z_1}{u_1}\right)\right) * 10V. \tag{62}$$

The output of the analog signal processor 140 given by Eq. (62) is valid for values of angle such that –90°≦φ≦90°.

The transfer functions of the operational amplifier circuits 100-102 are the same in the circuit of FIG. 5 as in FIG. 4 and are given by Eq. (60).

The transfer function of the operational amplifier circuit 122 is also the same in the circuit of FIG. 5 as in FIG. 4 and is given by Eq. (60).

Figure 6:
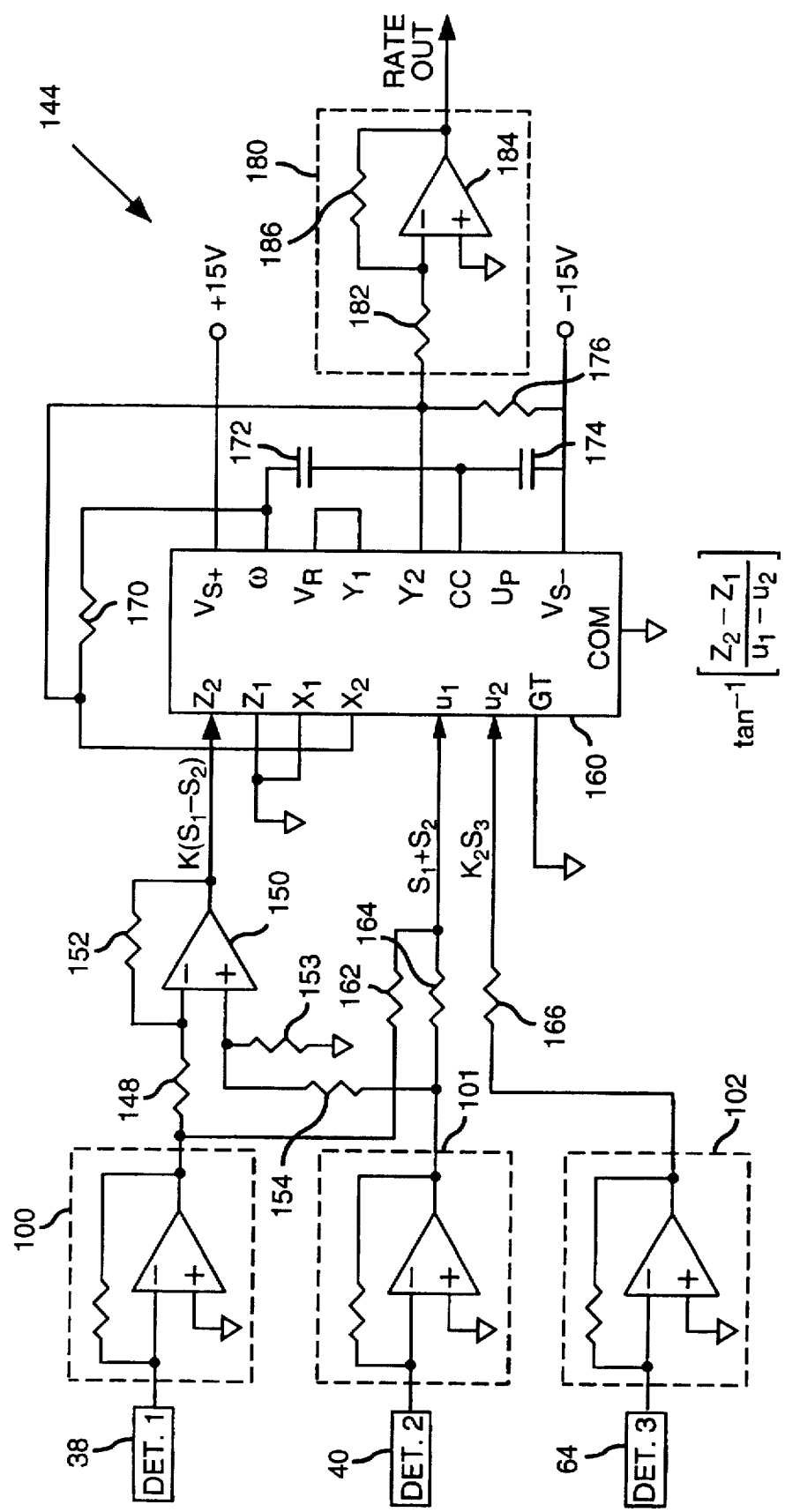
FIG. 6 illustrates a first electronic circuit for processing signals output from the fiber optic rotation sensor of FIG. 1 to produce a rotation rate output signal.

Referring now to FIG. 6, there is shown electronic processing circuitry 144 that may be used to determine the rotation rate from the Sagnac phase shift using the arc tangent of the angle. The starting point for the analysis of the circuit of FIG. 6 is the set of Eqs. (40), (41) and (42) for the electro optic signals $S_3$, $S_1$ and $S_2$, respectively. Dividing the signal $S_1$ by the signal $S_3$ gives:

$$\frac{S_1}{S_3} = \frac{2}{9} \frac{(1-\cos 3kL)}{5+4\cos 3kL} (7 + 2\cos 3kL - 2\cos\phi(1-\cos 3kL) + 6\sin\phi\sin 3kL) \quad (63)$$

Dividing the signal $S_2$ by the signal $S_3$ gives:

$$\frac{S_2}{S_3} = \frac{2}{9} \frac{(1-\cos 3kL)}{(5+4\cos 3kL)} (7 + 2\cos 3kL - 2\cos\phi(1-\cos 3kL) - 6\sin\phi\sin 3kL). \quad (64)$$

Adding the signals $S_1$ and $S_2$ together and dividing the result by $S_3$ gives $$\frac{S_1+S_2}{S_3} = \frac{4}{9} \frac{(1-\cos 3kL)}{(5+4\cos 3kL)} (7 + 2\cos 3kL - 2(1-\cos 3kL) - \cos\phi) \quad (64)$$

$$\frac{S_1+S_2}{S_3} = k_2 + k_3 \cos\phi \quad (65)$$

Where the constants $k_2$ and $k_3$ are defined by $$k_2 = \frac{4}{9} \frac{(1-\cos 3kL)(7+2\cos 3kL)}{(5+4\cos 3kL)} \quad (66)$$

$$k_3 = -\frac{8}{9} \frac{(1-\cos 3kL)^2}{(5+4\cos 3kL)}. \quad (67)$$

From Eq. (45) the constant $k_1$ is defined by $$k_1 = \frac{8}{3} \frac{(1-\cos 3kL)\sin 3kL}{(5+4\cos 3kL)} \quad (68)$$

Equations (66), (67) and (68) may be solved for the sine and cosine of the angle $\phi$, which gives:

$$\cos\phi = \frac{1}{k_3} \left( \frac{S_1+S_2}{S_3} - k_2 \right) \text{ and} \quad (69)$$

$$\sin\phi = \frac{1}{k_1} \left( \frac{S_1-S_2}{S_3} \right). \quad (70)$$

Using well-known trigonometric equation relating the sine, cosine and tangent of an angle, the tangent of the angle $\phi$ may be written as:

$$\tan\phi = \frac{\sin\phi}{\cos\phi} = \frac{k_3}{k_1} \left( \frac{S_1-S_2}{S_1+S_2-k_2 S_3} \right) \quad (71)$$

The angle $\phi$ may now be calculated by taking the inverse of the function expressed in Eq. (71). The angle $\phi$ therefore may be expressed as:

$$\phi = \tan^{-1}\left( \frac{k_3}{k_1} \left( \frac{S_1-S_2}{S_1+S_2-k_2 S_3} \right) \right), \quad (72)$$

which is valid for angles $\phi$ such that $-90° < \phi < 90°$.

Referring again to FIG. 6, the output of the detector 38 is amplified by an amplifier circuits 100, 101 and 102, respectively, which may be identical to the amplifier circuits 100, 101 and 102 shown in FIGS. 4 and 5. The signal $S_1$ output from the amplifier circuit 100 is input to one terminal of a resistor 148 which has a resistance value $R_1$. The other terminal of the resistor 148 is connected to the inverting input of an operational amplifier 150. A shunt resistor 152 having a resistance value $kR_1$ is connected between the inverting terminal and the output terminal of the operational amplifier 150. A first terminal of a resistor 153 having a resistance value of $kR_1$ is connected to the non-inverting input of the operational amplifier 150. The other terminal of the resistor 153 is grounded.

The signal $S_2$ output from the amplifier circuit 102 passes through a resistor 154 that has a resistance value $R_1$ to the non-inverting input of the operational amplifier 150. The signal output of the operational amplifier 150 is thus $k(S_1-S_2)$, which is applied to the $Z_2$ terminal of an analog signal processor 160.

The signal $S_1$ output from the amplifier circuit 100 passes through a resistor 162 having a resistance value $R_1$ to a terminal $u_1$ of the analog signal processor 160. The signal $S_2$ is connected to the terminal $u_1$ of the analog signal processor 160 by a resistor 164 having a resistance value $R_1$. Therefore, the terminal u1 of the analog signal processor 160 has an input given by $S_1 + S_2$.

The signal $S_3$ output from the amplifier circuit 102 passes through a resistor 166 having a resistance value $k_2 R_1$, to a terminal $u_2$ of the analog signal processor 160. Therefore, the input to the terminal $u_2$ of the analog signal processor 160 is $k_2 S_3$.

The analog signal processor 160 may be a commercially available AD639 analog signal processor. The analog signal processor 160 has terminals $Z_1$, $X_1$, GT and COM that are connected to ground potential. The analog signal processor 160 has a resistor 170 connected between terminals $X_2$ and $\omega$, which is connected to a terminal CC via a capacitor 172. The resistor 170 preferably has a resistance of about 5000 Ω. A capacitor 174 is connected between the terminal CC and a terminal labeled $V_{S-}$. A resistor 176 is connected between the terminals $Y_2$ and $V_{S-}$. The resistor 170 preferably has a resistance of about 16 KΩ. Terminals $V_R$ and $Y_1$ of the analog signal processor 160 are connected together.

The output of the analog signal processor 160 is taken at the terminal $Y_2$ and is input to a multiplier circuit 180. The multiplier circuit 180 includes a resistor 182 connected to the inverting input of an operational amplifier 184. A shunt resistor is connected between the output and the inverting input of an operational amplifier 184. The non-inverting input of the operational amplifier 184 is grounded.

As connected according to FIG. 6, the analog signal processor 160 has a transfer function $$\phi = \tan\left( \frac{(Z_1-Z_2)}{u_1-u_2} \right). \quad (73)$$

From the physics of the fiber optic rotation sensor the angle $\phi$ is given by $$\phi = \tan\left( \frac{k(S_1-S_2)}{S_1+S_2-k_2 S_3} \right). \quad (74)$$

Figure 7:
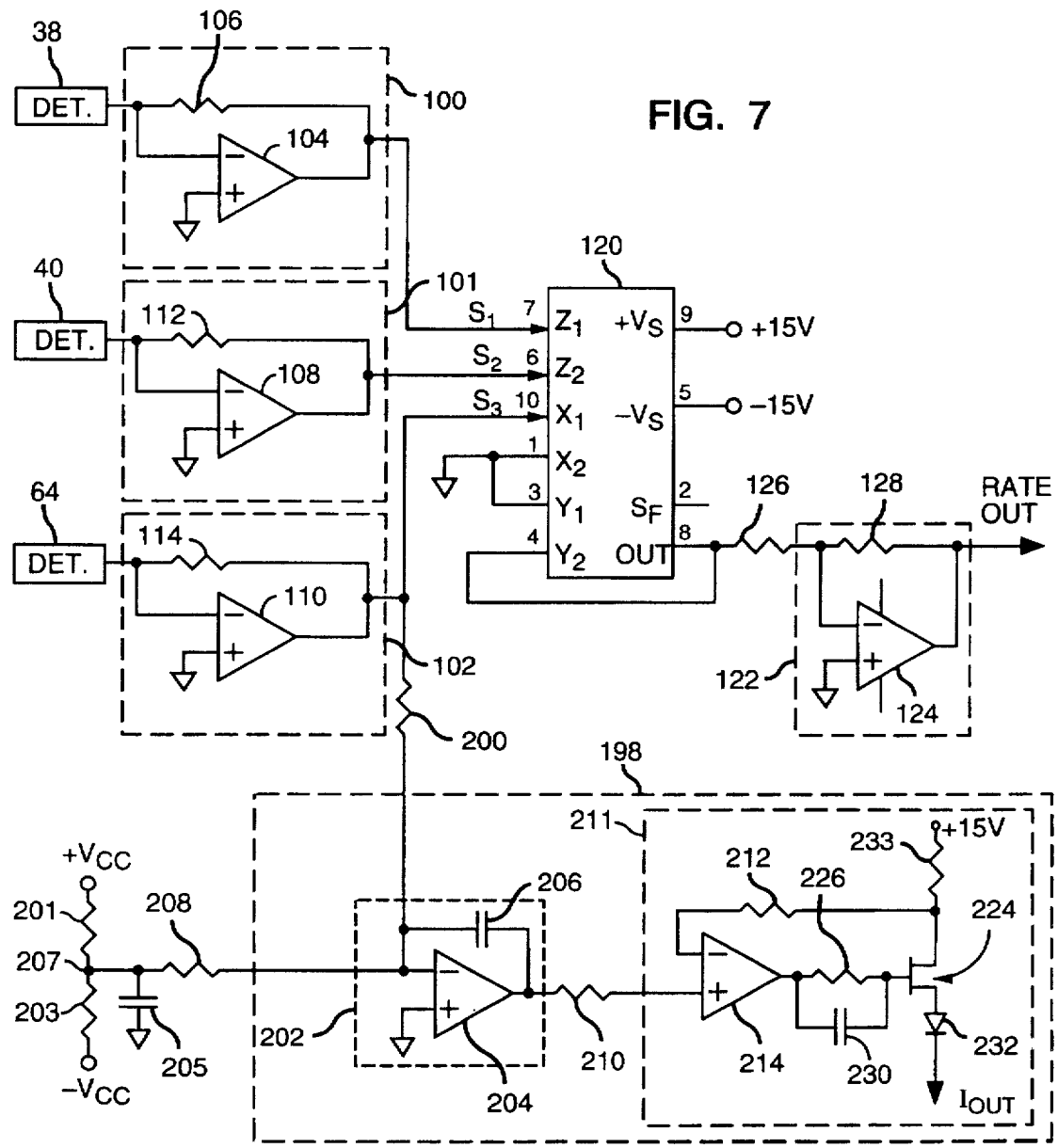
FIG. 7 shows feedback circuitry that may be used with the circuitry of FIG. 4 to stabilize the optical signal source included in FIG. 1.

FIG. 7 illustrates an embodiment of the invention that is similar to the embodiment of FIG. 4 but with the addition of an intensity control circuit 198 for stabilizing the optical signal source 50 (FIG. 1). A resistor 200 is connected to the output of the amplifier circuit 102 to receive part of the signal $S_3$. An integrator circuit 202 is connected to the resistor 200 to receive the signal $S_3$ therefrom. The integrator circuit 202 includes an operational amplifier 204 and a capacitor 206 connected across the inverting input and the output of the operational amplifier 204. The integrator circuit 202 thus has a transfer function of 1/s in LaPlace notation. The non-inverting input of the operational amplifier 204 is grounded.

A resistor 208 is connected between the inverting input of the operational amplifier 204 and a first terminal of a capacitor 205. The other terminal of the capacitor 205 is grounded. The resistor 208 and capacitor 205 are also connected to a junction 207 of a pair of resistors 201 and 203. The resistors 200 and 208 may have resistance values of about 10 KΩ.

Voltages +$V_{cc}$ and -$V_{cc}$ are applied to the resistors 201 and 203, respectively. The other terminals of these resistors are connected to each other and to one terminal of the resistor 208. The resistors 201 and 203 are used to adjust the current in the laser diode 202.

The output of the integrator is connected to a transconductance amplifier circuit 211 by an isolation resistor 210. The transconductance amplifier circuit 211 includes an operational amplifier 214 and a JFET 224. The output of the integrator circuit 202 passes through the isolation resistor 210 to the non-inverting input of an operational amplifier 214. The operational amplifiers 204 and 214 may be commercially available OP270 operational amplifiers. The resistor 210 preferably has a resistance value of about 50 KΩ. The inverting input of the operational amplifier 214 is connected to the source terminal of a JFET 224. The gate of the JFET 224 is connected to the output of a resistor 226 and a capacitor 230 that are connected in parallel between the JFET 224 and the output of the operational amplifier 214. The capacitor 230 preferably has a capacitance of about 100 pf, and the resistor 226 preferably has a resistance value of about 10 KΩ.

The drain of the JFET 224 is connected to a diode 232. The current $I_{out}$ output of the diode 232 is fed back to the light source 50. The current $I_{out}$ is constant as the temperature changes, which maintains the signal $S_3$ at a constant value. The source of the JFET 224 is connected to a resistor 233.

Referring still to FIG. 7, the resistors 201 and 203 provide a reference voltage which is summed through the resistor 208 with the output of the amplifier circuit 102 for the photo-detector 64. As the optical power from the light source increases (decreases) the output voltage of the amplifier circuit 102 decreases (increases). The reference voltage at the junction 207 of the resistors 201 and 203 is set to the negative of the voltage from the photo-detector amplifier voltage at the desired output power of the light source 50 (shown in FIG. 1) and is stabilized by the capacitor 205. The integrator circuit 202 accumulates the error between the sum of the reference voltage and the measured output power of the light source 50 as measured by the amplifier circuit 102. If a positive (negative) error signal is detected, that is, if the output of the amplifier circuit 102 is greater (less) than the reference, then the voltage output of the integrator circuit 202 becomes negative (positive).

The transconductance amplifier circuit 211 converts the voltage from the integrator circuit 202 to a current which drives the light source 50. If the output power of the light source 50 is too high (low), the output of the amplifier circuit 102 is too low (high), the integrator 202 output is high (low). The integrator circuit 202 creates a positive (negative) error signal, which decreases (increases) the output of the operational amplifier 214, and turns the field effect transistor 224 more "off" ("on"), thereby decreasing (increasing) the current to the light source, decreasing (increasing) the output power detected by the photo-detector 64 and decreasing the magnitude of the error signal, creating a feedback loop that stabilizes the optical power output from the light source 50.

The output of the operational amplifier 214 is connected to the gate of a field effect transistor 224 through the resistor 226 and the capacitor 230. The resistors 226 and 210 and the gate-source voltage across the transistor 224, form a negative feedback circuit which generates a stable current source for the light source. The capacitor 230 decreases the high frequency gain, and thereby reduces high frequency noise in the control circuit 211. The source of the field effect transistor is connected to the positive supply voltage +15 V through the resistor 233. The resistor 205 also provides current limiting to prevent an over current condition on the light source 50. The nominal value for the resistor 205 is determined by the maximum current rating of the light source and the maximum voltage of the supply voltage, and the minimum voltage drops across the source and drain of the field effect transistor 224, and the reverse current protection diode 232. The output of the circuit $I_{out}$ is connected to the positive terminal of the laser diode. If the laser diode requires a negative current source, then the circuit must be modified accordingly. The voltage divider voltage reference can optionally be replaced by a precision reference using standard technology, not shown.

Figure 8:
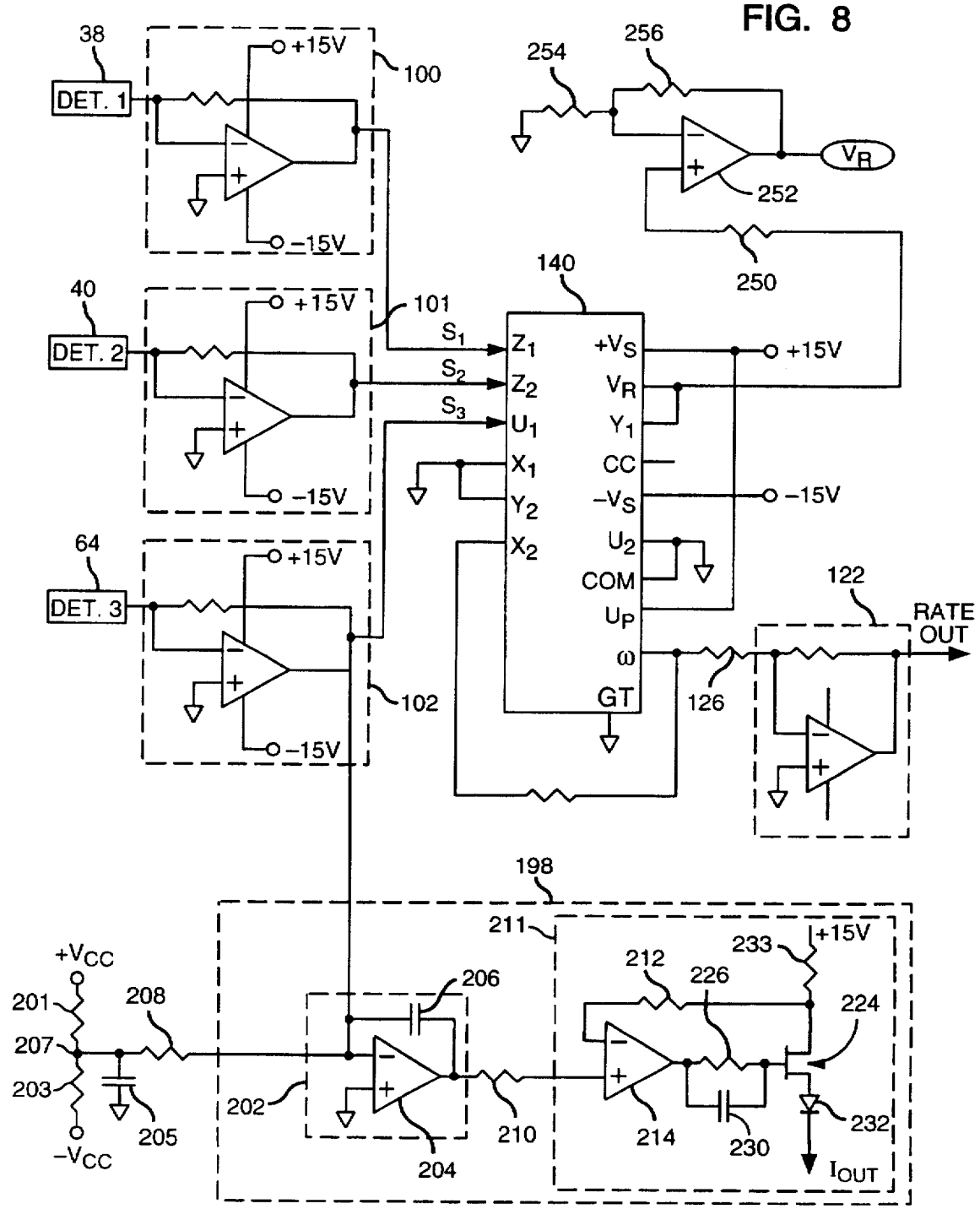
FIG. 8 shows feedback circuitry that may be used with the circuitry of FIG. 5 to stabilize the optical signal source included in FIG. 1.

FIG. 8 shows the intensity control circuitry 198 added to the embodiment of FIG. 5 to stabilize the optical signal source 50 of FIG. 1. The $V_R$ terminal of the analog signal processor 140 is connected to a resistor 250 that is connected to the non-inverting input of an operational amplifier 252. A resistor 254 has one grounded terminal and another terminal that is connected to the inverting input of the operational amplifier 252. A resistor 256 is connected between the inverting input and the output of the operational amplifier 252. The voltage at the output of the operational amplifier 252 is a reference voltage $V_R$.

Figure 9:
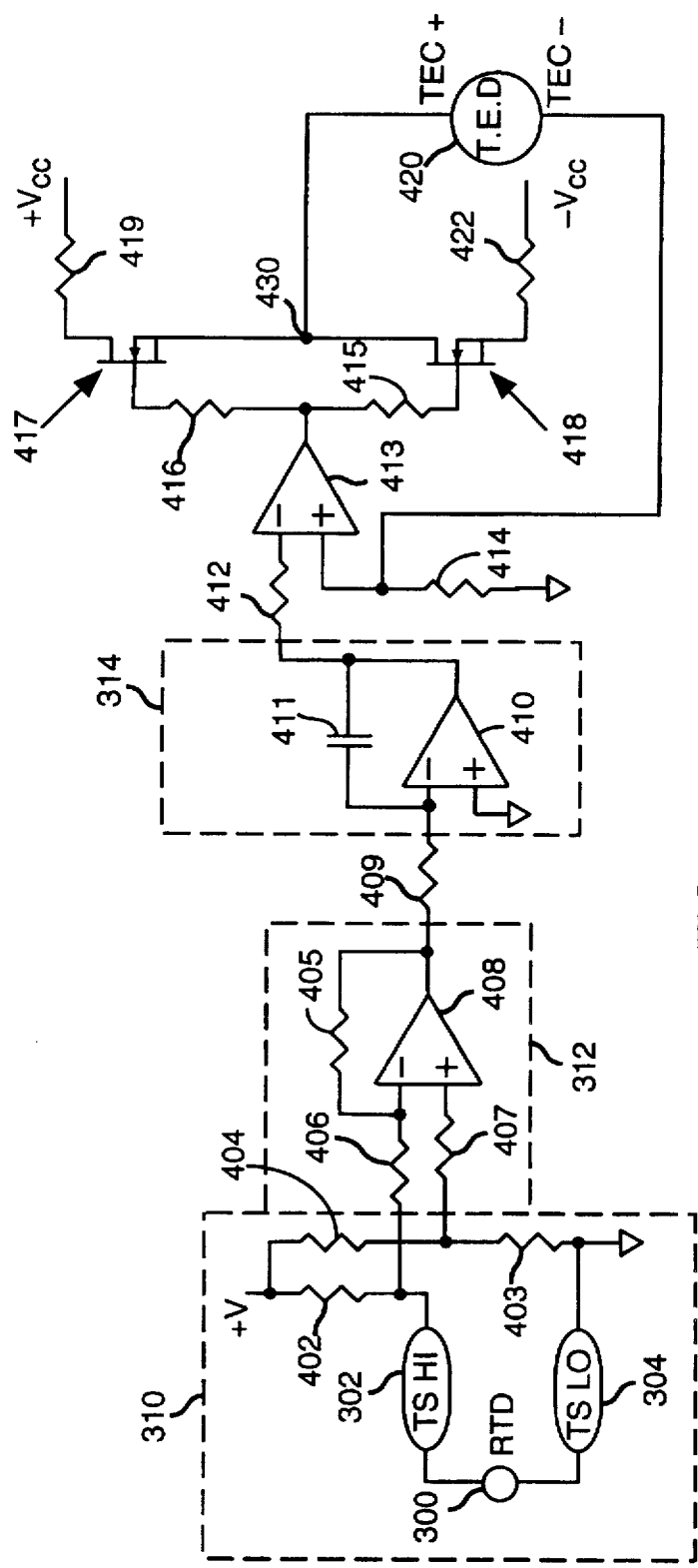
FIG. 9 shows feedback circuitry that may be used with the circuitry of FIG. 6 to stabilize the optical signal source included in F and FIG. 10 illustrates circuitry for determining totation rate by processing signals output from the fiber optic rotati sensor of FIG. 1

The optical signal intensity output from the optical signal source 50 is a function of temperature. FIG. 9 illustrates apparatus for controlling the temperature of the optical signal source. Referring to FIGS. 1 and 9 a resistive temperature device (RTD) 300, a temperature sensor terminal 302 (indicated as TS HI in FIG. 9) and a temperature sensor terminal 304 (indicated as TS LO in FIG. 9) and resistors 402, 403 and 404 form a Wheatstone bridge circuit 310. The resistors 402, 404 must be equal in value, and preferably, approximately equal to the resistance value of the resistance of the resistive temperature device 300 at the set point temperature. The resistor 403 must equal the resistance of the resistive temperature device 300 temperature sensor at the set point temperature. When the temperature of the resistive temperature device 300 causes the resistance of the resistive temperature device 300 to match the resistance of the set point resistor 403, the voltage difference between the temperature sensor 302 and the temperature reference, the junction of resistors 404, 407 and 403, is zero.

A differential amplifier circuit 312 measures with unity gain, the voltage difference across the Wheatstone bridge circuit 407. The temperature reference voltage is connected to the non-inverting input of an operational amplifier 408 through a resistor 407. The temperature sense voltage TS HI is connected to the inverting input of the operational amplifier 408 through a resistor 406. The gain of the operational amplifier 408 is set to unity by making the resistances of the resistors 404, 405 and 406 equal to resistances of the resistors 403.

The differential amplifier circuit 312 is connected to an integrator circuit 314 through a resistor 409. The integrator circuit includes an operational amplifier 410 and a capacitor 411 connected in parallel. The integrator circuit 314 integrates the error signal from the Wheatstone bridge 310 and the differential amplifier circuit 312. The output of the integrator 314 is connected through a resistor 412 to the inverting input of an operational amplifier 413. The output of the operational amplifier 413 is connected to the gates of a pair of field effect transistors 417 and 418 through resistors 416 and 415, respectively. The source of the JFET 417 is connected to a resistor 419, and the source of the JFET 418 is connected to a resistor 422. The drains of the JFETS 417 and 418 are connected together at a junction 430, which is connected to a thermoelectric device 420, which is arranged to selectively heat or cool the laser diode 50 (FIG. 1).

The circuit of FIG. 9 is designed so that one of the following conditions is met:

1. Both field effect transistors are off and the steady state temperature=set point.
2. field effect transistor 417 controlling field effect transistor 418 off and the steady state temperature <set point (heating).
3. field effect transistor 418 controlling field effect transistor 417 off and steady state temperature >set point (cooling).

When the temperature at the temperature sensor is low (high), the resistive temperature device 300 has a resistance which is low (high). The low (high) resistance value causes the output of the differential amplifier 312 to be high (low). The high (low) output of the differential amplifier 312 is integrated by the integrator circuit 314 which produces a low (high) output voltage. The low (high) output of the integrator 314 decreases (increases) the signal at the inverting input of the operational amplifier 410, causing an imbalance between the current sense at the positive input of the operational amplifier 413 which increases (decreases) the voltage to the gates of the field effect transistors 417 and 418, decreasing (increasing) the current to the thermoelectric device 420, decreasing (increasing) the cooling and raising the temperature at the set point. The thermoelectric device 420 switches from cooling to heating when the current direction is reversed. The current sense resistor 414, the operational amplifier 413 and the resistors 415 and 422 and the FET 418 or the resistors 416 and 419 and the FET 417 form a closed loop negative feed back system which maintains a stable current to the thermoelectric device 420. The set current for the thermoelectric device 420 is set by the output of the temperature sense circuitry at the output of operational amplifier 413.

Figure 10:
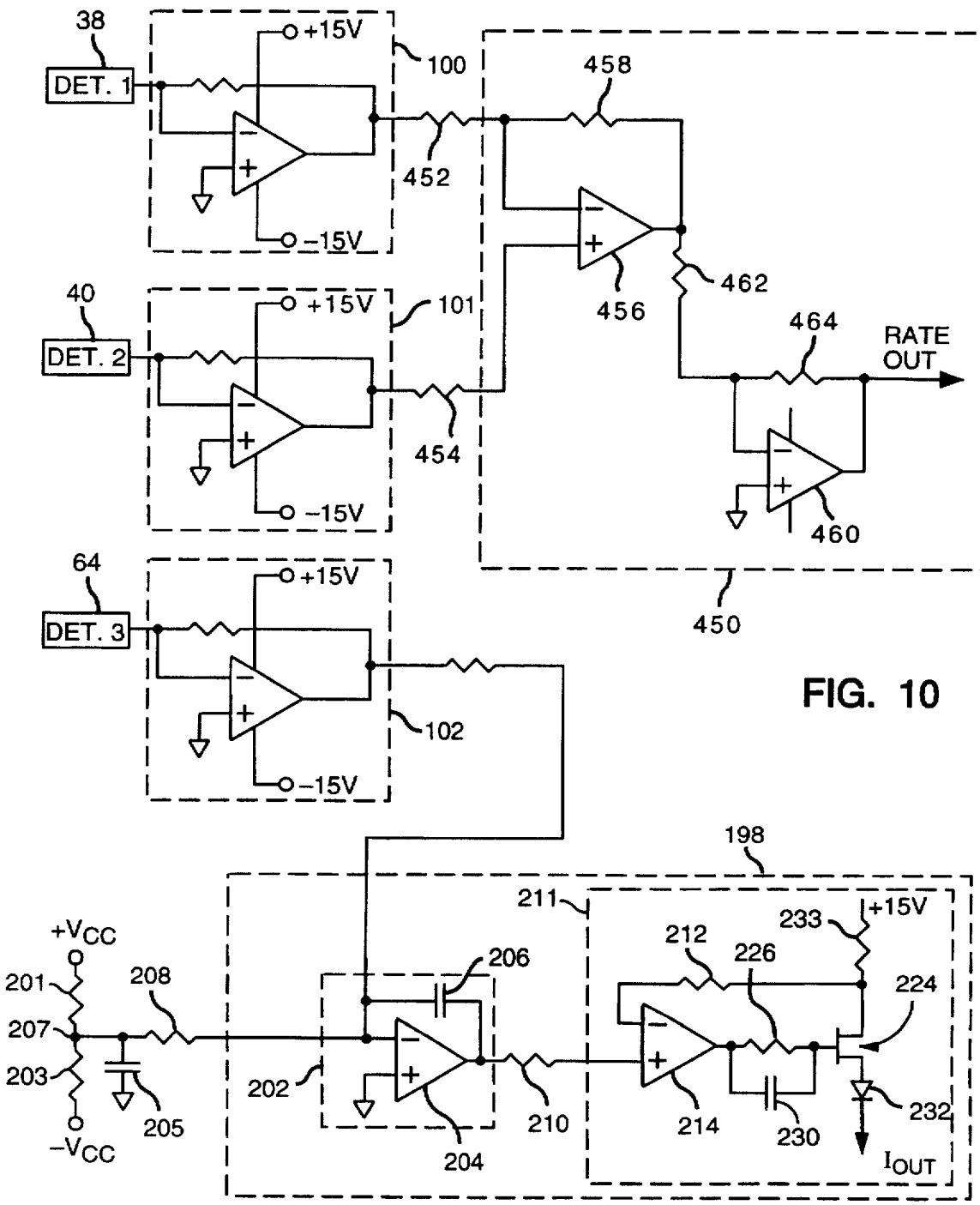

FIG. 10 illustrates circuitry having a rate sense circuit 450 connected to the amplifier circuits 100-102. With a stabilized light source 50 the output of the optical power sensor is constant. If the optical power is constant, the denominator in Eq. (59) is constant so that Eq. (59) become simply:

$$\Phi = K(S_1 - S_2). \tag{75}$$

The circuitry of FIG. 10 solves Eq. (75). The outputs of the detector circuits 100 and 101 are input to resistors 452 and 454, respectively. The resistors 452 and 454 are connected to the inverting and non-inverting inputs, respectively of an operational amplifier 456. A feedback resistor 458 is connected across the inverting input and the output of the operational amplifier 456. The output of the operational amplifier 456 is indicative of the difference between the inputs from the resistors 452 and 454. For unity gain, the resistors 452, 454 and 458 are all equal in value. The output of the operational amplifier 456 is input to an operational amplifier 460 through a resistor 462. The operational amplifier 460 has a feedback resistor 464 connected thereto to form a standard inverting amplifier. The constant K in Eq. (75) is implemented by selecting an appropriate scale factor for the rate using the resistors 462 and 464.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic rotation sensor for sensing rotation of a sensing loop of optical fiber about a sensing axis perpendicular to the plane of the sensing loop, comprising:

a 3×3 optical coupler that includes first, second and third optical waveguides formed in a substrate and arranged to have coupling ratios such that the fractions of light coupled from any one of the first, second and third optical waveguides to the other two optical waveguides are constant, independent of temperature changes in the 3×3 optical coupler;

an optical signal source arranged to provide an input optical signal to the first optical waveguide such that portions of the input optical signal are coupled from the first optical waveguide into the second and third optical waveguides; and the optical fiber in which the sensing loop is formed having ends that are coupled to the second and third optical waveguides to receive optical signals that form counterpropagating optical waves in the sensing loop and to combine the counterpropagating optical waves after they have traversed the sensing loop;

a first photodetector arranged to produce a first signal $S_1$ indicative of a first optical signal output from the sensing loop due to interference of the counterpropagating waves in the sensing loop to a first one of the optical waveguides;

a second photodetector arranged to produce a first signal $S_2$ indicative of a second optical signal output from the sensing loop due to interference of the counterpropagating waves in the sensing loop to a second one of the optical waveguides;

a third photodetector arranged to produce a signal $S_3$ indicative of the optical signal input to the coupler; and an analog signal processor connected to the first, second and third photodetectors to receive the signals $S_1$, $S_2$ and $S_3$, the analog signal processor being arranged to calculate the rate of rotation of the sensing loop as a function of the signals $S_1$, $S_2$ and $S_3$.

2. A fiber optic rotation sensor for sensing rotation of a sensing loop of optical fiber about a sensing axis perpendicular to the plane of the sensing loop, comprising:

a 3×3 optical coupler formed in a substrate and that includes first, second and third optical waveguides arranged to have coupling ratios such that the fractions of light coupled from any one of the first, second and third optical waveguides to the other two optical waveguides are constant;

an optical signal source arranged to provide an input optical signal to the first optical waveguide such that portions of the input optical signal are coupled from the first optical waveguide into the second and third optical waveguides;

the optical fiber in which the sensing loop is formed having ends that are coupled to the second and third optical waveguides to receive optical signals that form counterpropagating optical waves in the sensing loop and to combine the counterpropagating optical waves after they have traversed the sensing loop, the first, second and third optical waveguides being formed such that the optical splitting ratios are 0.4108:0.1783:0.4108, so that when light intensity $A^2$ is input to the first optical waveguide, the optical intensity output by each of the second and third optical waveguides to the optical fiber to form the counterpropagating waves is $0.4108A_2$ and the optical intensity output by the first optical waveguide is $0.1783A_2$;

a first photodetector arranged to produce a first signal $S_1$ indicative of a first optical signal output from the sensing loop due to interference of the counterpropagating waves in the sensing loop to a first one of the optical waveguides;

a second photodetector arranged to produce a first signal $S_2$ indicative of a second optical signal output from the sensing loop due to interference of the counterpropagating waves in the sensing loop to a second one of the optical waveguides;

a third photodetector arranged to produce a signal $S_3$ indicative of the optical signal input to the coupler;

an analog signal processor connected to the first, second and third photodetectors to receive the signals $S_1$, $S_2$ and $S_3$, the analog signal processor being arranged to calculate the rate of rotation of the sensing loop as a function of the signals $S_1$, $S_2$ and $S_3$;

intensity control circuitry for processing the signal $S_3$ to produce a feedback signal that is input to the optical signal source to drive current of the optical signal source at a constant magnitude; and temperature control apparatus for maintaining the optical signal source a temperature that is between a predetermined upper temperature limit and a predetermined lower temperature limit.

3. The apparatus of claim 1 wherein the temperature control apparatus comprises:

temperature sensing apparatus for producing an error signal when the optical signal source is at either the upper or lower temperature limits;

a differential amplifier connected to the temperature sensor to amplify the error signal;

an integrating circuit connected to the differential amplifier to integrate the amplified error signal;

an operational amplifier having an inverting input connected to the output of the integrating circuit;

a first JFET having its gate connected to the output of the operational amplifier;

a voltage source $+V_{cc}$ connected to the source of the first JFET;

a second JFET having its gate connected to the output of the operational amplifier, the drains of the first and second JFETS being connected together;

a voltage source $-V_{cc}$ connected to the source of the second JFET; and a thermoelectric device arranged to control the temperature of the optical signal source, the thermoelectric device having a positive terminal connected to the drains of the first and second JFETS and a negative terminal connected to a non-inverting input of the operational amplifier, such that when there is an imbalance between the inputs to the operational amplifier, the output of the operational amplifier changes the voltage at the gates of the first and second JFETS, which then change the current to the thermoelectric device to either cool or heat it as necessary to return its temperature to a set point.

4. The apparatus of claim 3, further comprising intensity control circuitry for processing the signal $S_3$ to produce a feedback signal that is input to the optical signal source to maintain the drive current of the optical signal source at a constant magnitude.

5. The apparatus of claim 4 wherein the intensity control circuitry comprises:

an integrating circuit connected to the third photodetector to receive the signal $S_3$; and a transconductance amplifier connected between the integrating circuit and the optical signal source to supply a constant current $I_{out}$ thereto.

6. The apparatus of claim 5 wherein the transconductance amplifier comprises:

an operational amplifier connected to the integrating circuit;

a third JFET having its gate connected to the operational amplifier;

a voltage source connected to the source of the third JFET; and a diode connected between the drain of the third JFET and the optical signal source.

* * * * *